United States Patent
Chuang et al.

(10) Patent No.: US 7,755,369 B2
(45) Date of Patent: *Jul. 13, 2010

(54) CAPACITIVE FINGERPRINT SENSOR AND THE PANEL THEREOF

(75) Inventors: Kai Lan Chuang, Tainan County (TW); Ying Lieh Chen, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 143 days.

This patent is subject to a terminal disclaimer.

(21) Appl. No.: 12/034,375

(22) Filed: Feb. 20, 2008

(65) Prior Publication Data

US 2009/0206850 A1    Aug. 20, 2009

(51) Int. Cl.
*G01R 27/28* (2006.01)
*G06F 3/041* (2006.01)

(52) U.S. Cl. .................. 324/686; 324/649; 345/173
(58) Field of Classification Search ............... 324/686, 324/649, 662; 382/124; 345/173, 174
See application file for complete search history.

(56) References Cited

U.S. PATENT DOCUMENTS

| | | | | |
|---|---|---|---|---|
| 6,049,620 | A * | 4/2000 | Dickinson et al. | 382/124 |
| 6,906,529 | B2 * | 6/2005 | Blanchard | 324/662 |
| 7,075,316 | B2 * | 7/2006 | Umeda et al. | 324/658 |
| 7,099,497 | B2 * | 8/2006 | Chou et al. | 382/124 |

OTHER PUBLICATIONS

Hiroyuki Hara, Mikio Sakurai, Mitsutoshi Miyasaka, Simon W.B. Tam, Satoshi Inoue and Tatsuya Shimoda, Low Temperature Polycrystalline Silicone TFT Fingerprint Sensor with Integrated Comparator Circuit, Journal, 2004, pp. 403-406, IEEE.*

Hiroyuki Hara, Mikio Sakurai, Mitsutoshi Miyasaka, Simon W.B. Tam, Satoshi Inoue, and Tatsuya Shimoda, Low Temperature Polycrystalline Silicon TFT Fingerprint Sensor with Integrated Comparator Circuit, Journal, 2004, pp. 403-406, IEEE.

H.Hara, M.Miyasaka, C.Iriguchi, S.W.B.Tam, S.Inoue and T. Shimoda, A Capacitive Fingerprint Sensor with Integrated Comparator Based on LTPS TFTs, Journal, 2006, pp. 257-260, IDW.

* cited by examiner

*Primary Examiner*—Timothy J Dole
*Assistant Examiner*—Farhana Hoque
(74) *Attorney, Agent, or Firm*—WPAT, P.C.; Anthony King (57) ABSTRACT

A capacitive fingerprint sensor comprises a fingerprint capacitor, a reference capacitor, a first transistor, a second transistor, a comparator and a multiplexer. The fingerprint capacitor has a capacitance that is either a valley capacitance $C_{FV}$ or a ridge capacitance $C_{FR}$, wherein $C_{FV}$ is smaller than $C_{FR}$. One end of the reference capacitor $C_S$ is connected to the fingerprint capacitor, and the other end is connected to a trigger signal, wherein the trigger signal is initiated only during a precharge phase. The first transistor is configured to control the fingerprint capacitor during a scan line period. The second transistor is configured to precharge the fingerprint and reference capacitors. One end of the comparator is connected to the second transistor. The multiplexer is connected to another input end of the comparator for providing a first voltage VA and a threshold voltage Vth.

18 Claims, 6 Drawing Sheets

CAPACITIVE FINGERPRINT SENSOR AND THE PANEL THEREOF

BACKGROUND OF THE INVENTION

1. Field of the Invention

The present invention relates to a capacitive fingerprint sensor and the panel thereof, and more particularly to a capacitive fingerprint sensor using a plurality of transistors and the panel thereof.

2. Description of the Related Art

A fingerprint sensor is a sensor for recognizing a pattern of a human fingerprint and providing reliable personal identification. The fingerprint sensor is also widely used in portable products such as mobile phones or notebooks in order to achieve security of personal confidential information.

Figure 1A:
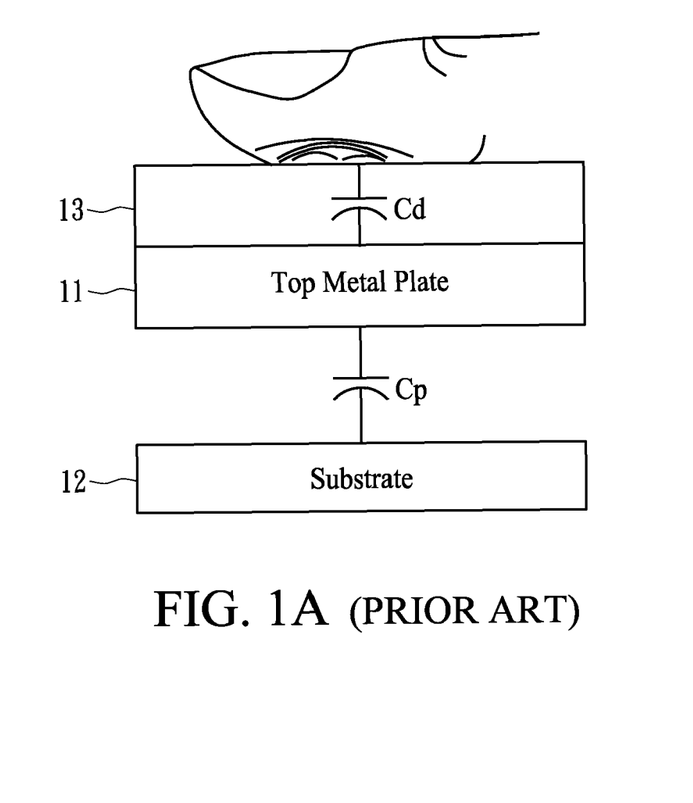
FIGS. 1A and 1B show an equivalent circuit of a fingerprint sensor.
Figure 1B:
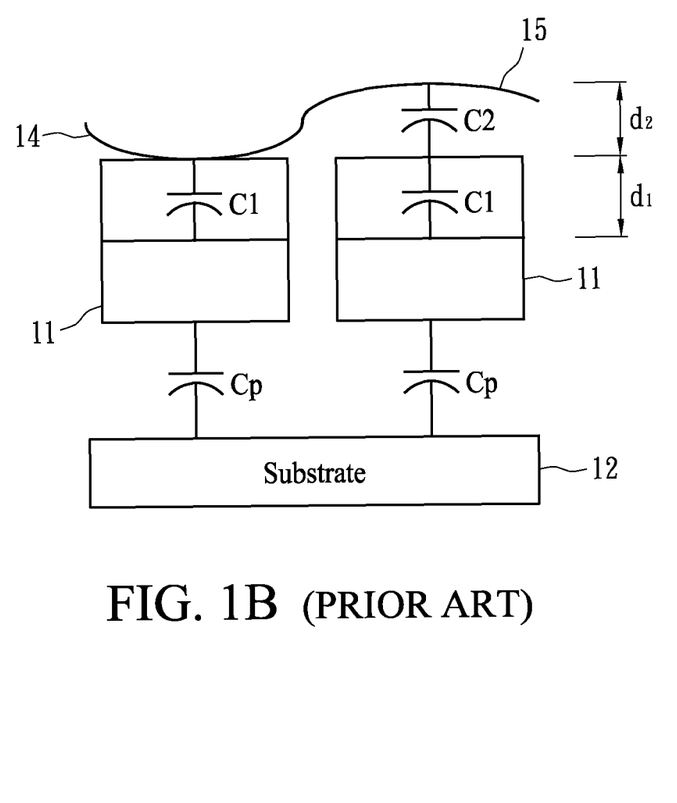

FIGS. 1A and 1B show a hint diagram about the relationship between the human finger and a substrate panel and the corresponding equivalent diagram. Generally, the fingerprint sensor could be implemented in a chip or embedded in an image panel. If the fingerprint sensor is implemented in a chip, the number 13 in FIG. 1A represents a passivation layer, which acts as the dielectric layer of the capacitor $C_d$. If the fingerprint sensor is embedded in an image panel, the number 11 in FIG. 1A represents ITO layer, and number 13 represents glass and thin films, such as color filter, polarizer and etc. The following description takes the fingerprint sensor embedded in the image panel as an example. In FIG. 1A, a glass 13, a top metal plate 11 and a substrate 12 are combined in series, and the glass 13 is the place where the human finger will touch. Normally, a capacitor $C_d$ exists in the glass 13, and a capacitor $C_p$ exists between the top metal plate 11 and the substrate 12. In FIG. 1B, the surface of the human finger has ridges and valleys, such as the ridge 14 and the valley 15. The valley 15 has a distance $d_2$ away from the glass 13 with a thickness $d_1$. Based on the structure, an additional capacitor C2 exists between the valley of the human finger and the surface of the glass 13. The equivalent capacitance of the ridge capacitor $C_{FR}$ is related to C1, and the equivalence capacitance of the valley capacitors $C_{FV}$ is related to C1//C2. The capacitances of C1 and C1//C2 are listed as follows:

$$C_1 = \frac{\varepsilon_1 A}{d_1}, \text{ and } C_1 // C_2 = \frac{1}{\frac{d_1}{\varepsilon_1 A} + \frac{d_2}{\varepsilon_2 A}}$$

Normally, the capacitance of the ridge capacitor $C_{FR}$ is far greater than the capacitance of the valley capacitors $C_{FV}$.

Traditional TFT fingerprint sensor pixel circuits have only one transistor. In accordance with the operation of such structure, a slight difference in capacitance sensed at each pixel circuit must be read directly. However, it is not easy to achieve the required accuracy in difference. Some environmental conditions such as noise and cross talk will deteriorate the result. Therefore, it is necessary to find another solution to achieve accurate detection.

SUMMARY OF THE INVENTION

The capacitive fingerprint sensor in accordance with one embodiment of the present invention comprises a fingerprint capacitor, a first transistor, a second transistor, an operational amplifier, a reference capacitor, a third transistor and a multiplexer. The fingerprint capacitor has a capacitance that is either a valley capacitance $C_{FV}$ or a ridge capacitance $C_{FR}$. One end of the reference capacitor $C_S$ is connected to the fingerprint capacitor, and the other end is connected to a trigger signal, wherein the trigger signal is asserted only during a precharge phase, and $C_{FV} < C_S < C_{FR}$. The first transistor has a gate terminal, an input terminal and an output terminal, wherein the gate terminal is controlled by a scan line, the input terminal is connected to the fingerprint capacitor, and the output terminal is connected to a readout line. The second transistor has a gate terminal, an input terminal and an output terminal, wherein the gate terminal is controlled by a first reset line and the input terminal is connected to the readout line. One end of the operational amplifier is connected to the output terminal of the second transistor. The third transistor has a gate terminal, an input terminal and an output terminal, wherein the gate terminal is controlled by a second reset line, and the input and output terminals are connected to the input and output ends of the operational amplifier. The multiplexer is connected to another input end of the operational amplifier, wherein inputs of the multiplexer are connected to a first voltage VA and a threshold voltage Vth.

The capacitive fingerprint sensor in accordance with one embodiment of the present invention comprises a fingerprint capacitor, a reference capacitor, a first transistor, a second transistor, a comparator and a multiplexer. The fingerprint capacitor has a capacitance that is either a valley capacitance $C_{FV}$ or a ridge capacitance $C_{FR}$, wherein $C_{FV}$ is smaller than $C_{FR}$. One end of the reference capacitor $C_S$ is connected to the fingerprint capacitor, and the other end is connected to a trigger signal, wherein the trigger signal is initiated only during a precharge phase. The first transistor is configured to control the fingerprint capacitor during a scan line period. The second transistor is configured to precharge the fingerprint and reference capacitors. One end of the comparator is connected to the second transistor. The multiplexer is connected to another input end of the comparator for providing a first voltage VA and a threshold voltage Vth.

The panel system in accordance with one embodiment of the present invention comprises an active matrix area, a data driver, a scan driver, a readout circuit and an image processing circuit. The active matrix area includes a fingerprint capacitor, a reference capacitor and a first transistor. The data driver is configured to drive data lines to the capacitive fingerprint sensors. The scan driver is configured to control scan lines to the capacitive fingerprint sensors. The readout circuit is configured to receive readout lines of the capacitive fingerprint sensors and to identify the type of the fingerprint capacitor. The readout circuit includes a second transistor, an operational amplifier, a third transistor and a multiplexer. The image processing circuit is connected to the readout circuit.

BRIEF DESCRIPTION OF THE DRAWINGS

The invention will be described according to the appended drawings in which.

PREFERRED EMBODIMENT OF THE PRESENT INVENTION

Figure 2:
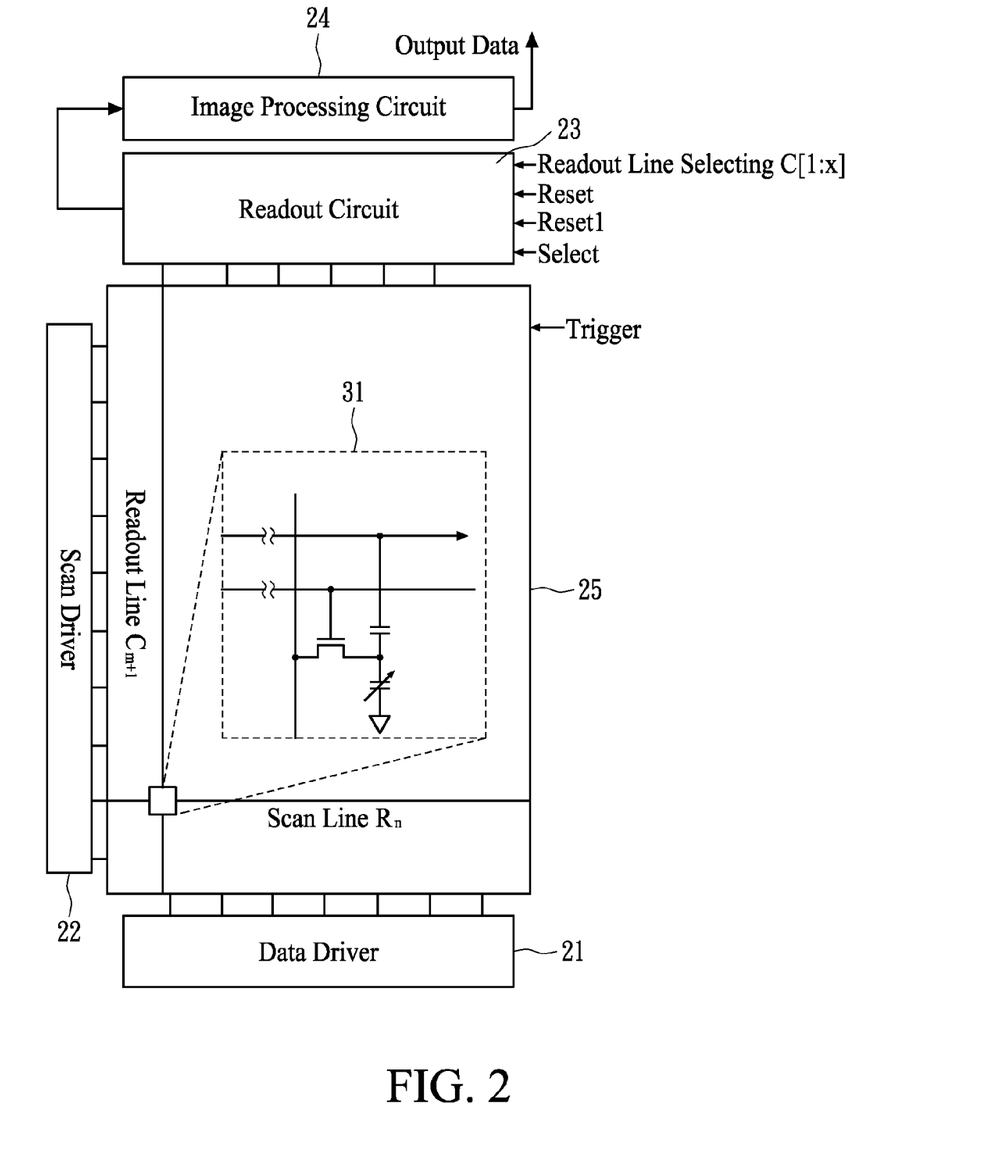
FIG. 2 shows the panel in accordance with an embodiment of the present invention.

FIG. 2 shows a panel in accordance with an embodiment of the present invention. The panel system comprises an active matrix area 25, a data driver 21, a scan driver 22, a readout circuit 23 and an image processing circuit 24. The active matrix area 25 includes a capacitive fingerprint sensor and/or image pixels. The capacitive fingerprint sensor has a plurality of capacitive fingerprint sensor cells 31, each of which can selectively coexist with an image pixel in a pixel unit. The data driver 21 is configured to drive data lines of image pixels. The scan driver 22 is configured to control scan lines to the capacitive fingerprint sensor cells 31. Normally, the scan line is asserted during the operation period of the capacitive fingerprint sensors connected to the scan line. The readout circuit 23 is configured to receive analog signals of readout lines of the capacitive fingerprint sensor cells 31 and to identify the type of the fingerprint capacitor, which exhibits the features of the ridge capacitor or valley capacitor. The image processing circuit 24 is connected to the readout circuit 23. The structure in FIG. 2 takes an embedded structure in an image panel as an example. But as known by persons skilled in this art, the structure in FIG. 2 can be easily transformed and applied to be implemented in a chip.

Figure 3:
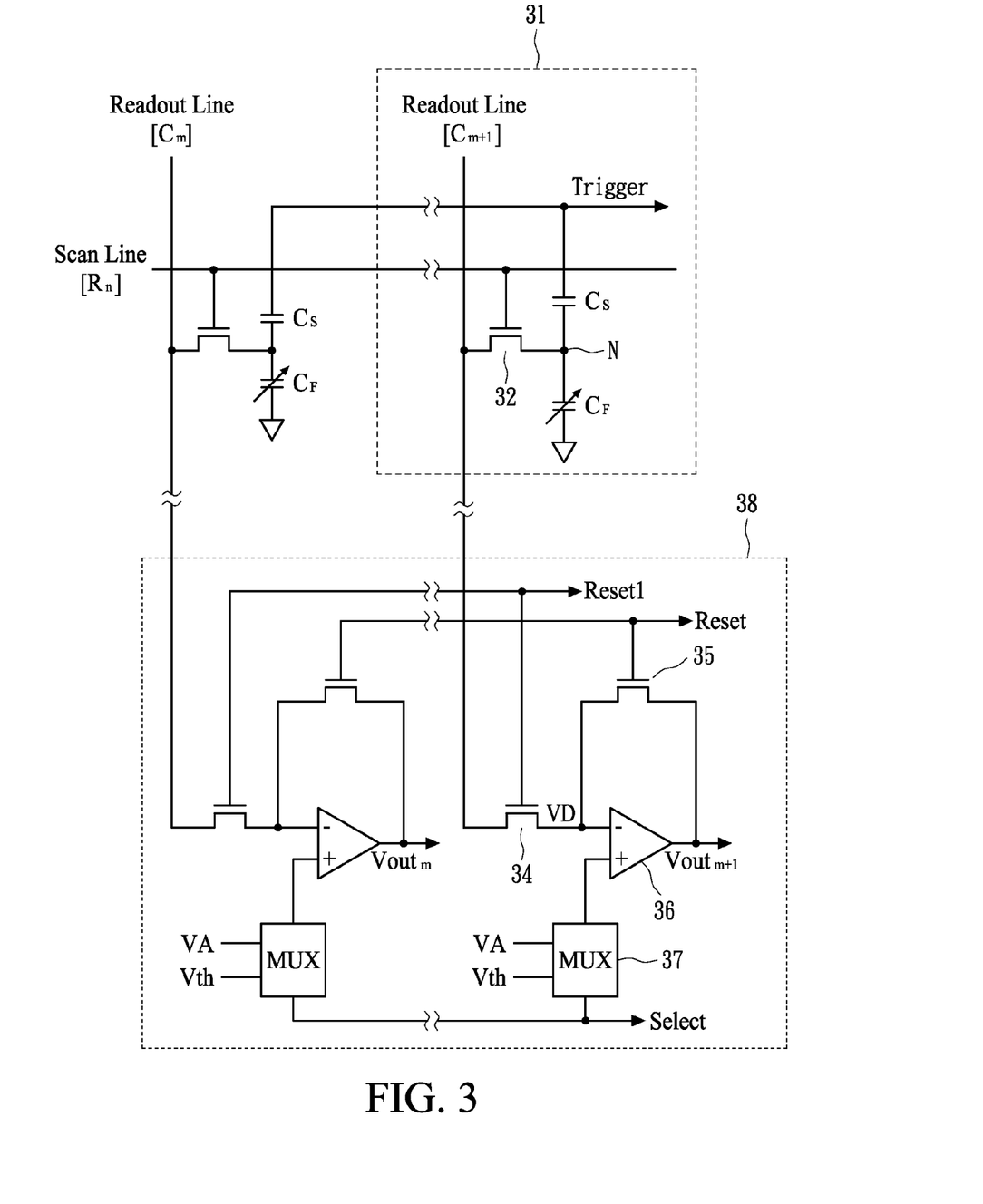
FIG. 3 shows the fingerprint sensor in accordance with an embodiment of the present invention.

FIG. 3 shows the capacitive fingerprint sensor in accordance with an embodiment of the present invention. The readout circuit 23 includes a control circuit 38. The capacitive fingerprint sensor cell 31 includes a first transistor 32, a reference capacitor $C_S$ and a fingerprint capacitor $C_F$, which is either a valley capacitance $C_{FV}$ or a ridge capacitance $C_{FR}$, and $C_{FV} < C_S < C_{FR}$. The first transistors 32 situated in the same row of the active matrix area 25 are commonly controlled by a scan line. One end of the reference capacitor Cs is connected to the fingerprint capacitor, and the other end is connected to a trigger signal, wherein the trigger signal is asserted only during a precharge phase. The first transistor 32 has a gate terminal, an input terminal and an output terminal, wherein the gate terminal is controlled by a scan line, the input terminal is connected to the fingerprint capacitor, and the output terminal is connected to a readout line, which is further connected to an input end of the control circuit 38.

Figure 6:
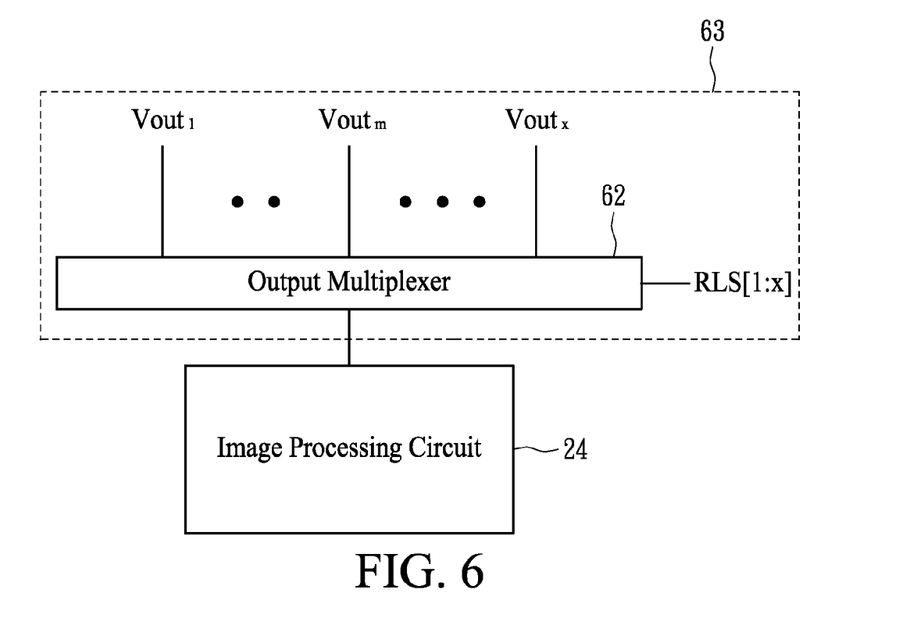
FIG. 6 shows the readout circuit in accordance with an embodiment of the present invention.

The control circuit 38 may be one part of the readout circuit 23, and another part 63 of the readout circuit is shown in FIG. 6. The control circuit 38 comprises a second transistor 34, an operational amplifier 36, a third transistor 35 and a multiplexer 37. The second transistor 34 has a gate terminal, an input terminal and an output terminal, wherein the gate terminal is controlled by a first reset line (Reset1) and the input terminal is connected to the readout line. One input end of the operational amplifier 36 is connected to the output terminal of the second transistor 34. The third transistor 35 has a gate terminal, an input terminal and an output terminal, wherein the gate terminal is controlled by a second reset line (Reset), and the input and output terminals are connected to the input and output ends of the operational amplifier 36. The multiplexer 37 is connected to another input end of the operational amplifier 36, wherein inputs of the multiplexer 37 are connected to a first voltage VA and a threshold voltage Vth.

Figure 4:
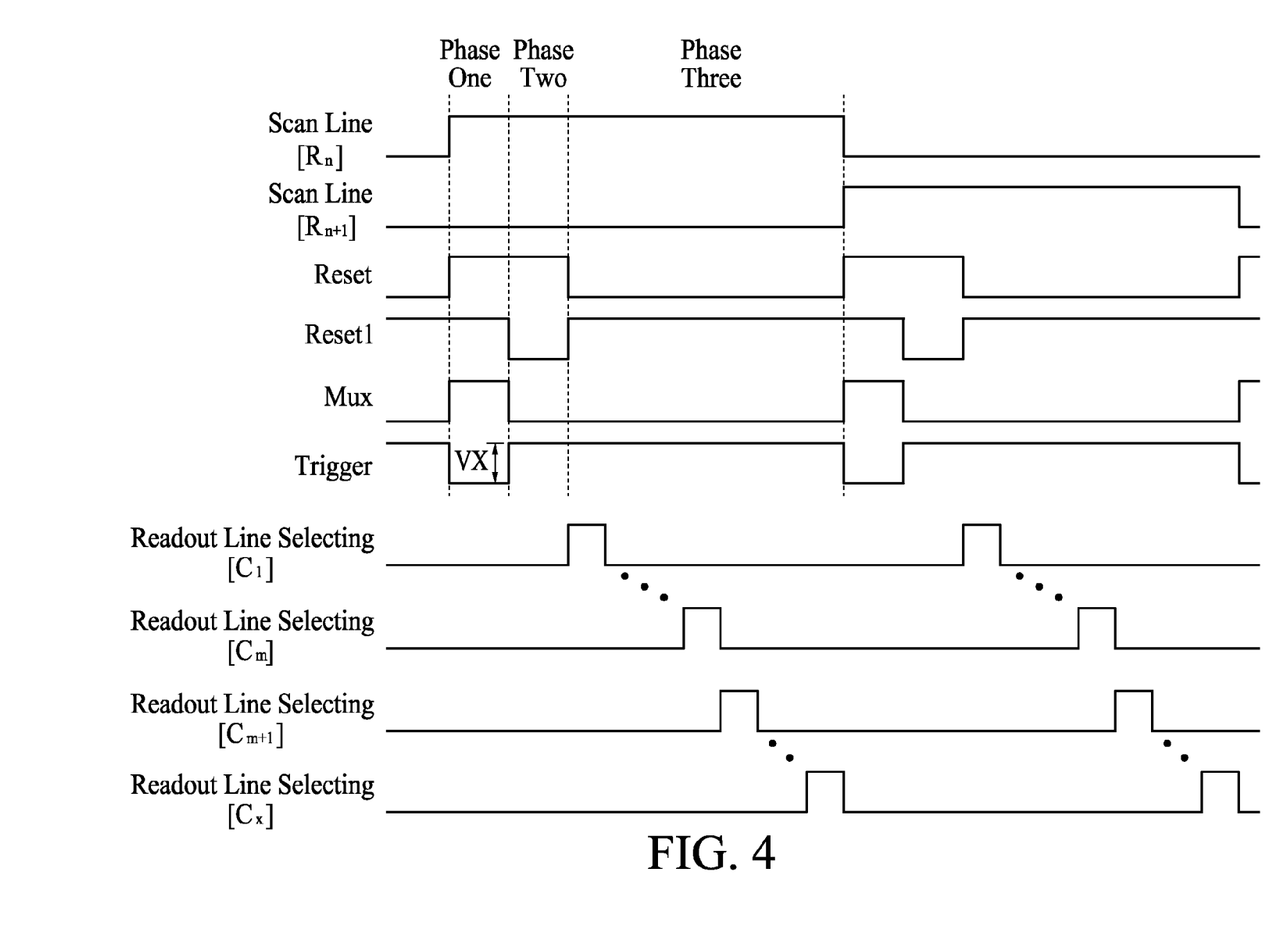
FIG. 4 shows the timing diagram of the circuit in FIG. 3.

FIG. 4 shows the timing diagram of the circuit in FIG. 3. Normally, the fingerprint sensors in the same row share the same scan line $R_n$, which is asserted during the operation of the fingerprint sensors in the same row. The timing of one cycle can be divided into precharge phase (phase one), transition phase (phase two) and evaluation phase (phase three). The first reset line (Reset1) is used in the precharge and evaluation phases, and the second reset line (Reset) is used in the precharge and transition phases. During the evaluation phase, the readout line selecting (RLS) sequentially transmits data selected from $Vout_1$ to $Vout_x$ to the image processing circuit 24. The trigger signal is in a low state during the precharge phase, and has a falling deficiency VX.

Figure 5A:
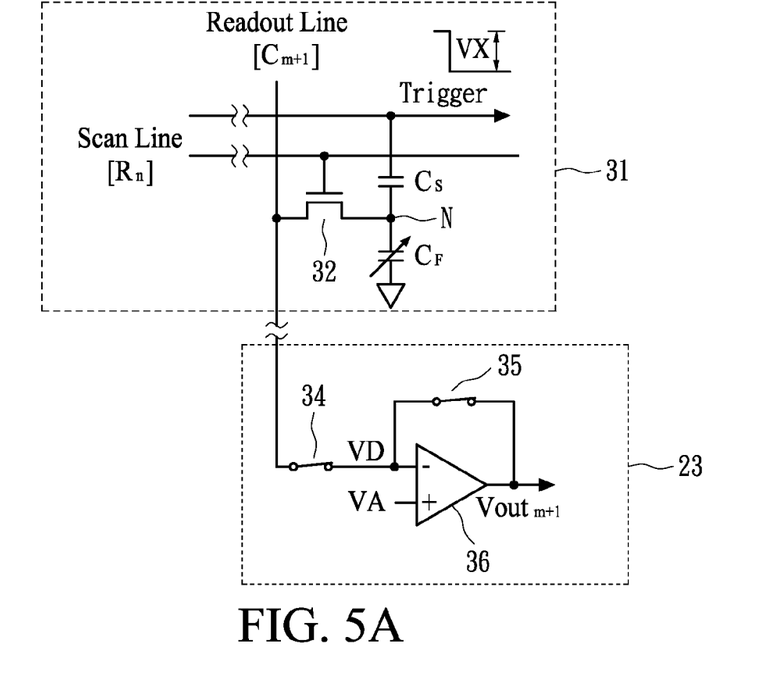
FIGS. 5A to 5C show the different phases of the circuit in FIG. 3.

FIG. 5A shows the equivalent circuit of the fingerprint sensor in the precharge phase. In the precharge phase for the fingerprint sensor 31, the second and third transistors 34 and 35 are turned on, and the multiplexer 37 selects VA being equal to VD such that the charge stored in the node N is equal to $(C_F+C_S) \times VA$.

Figure 5B:
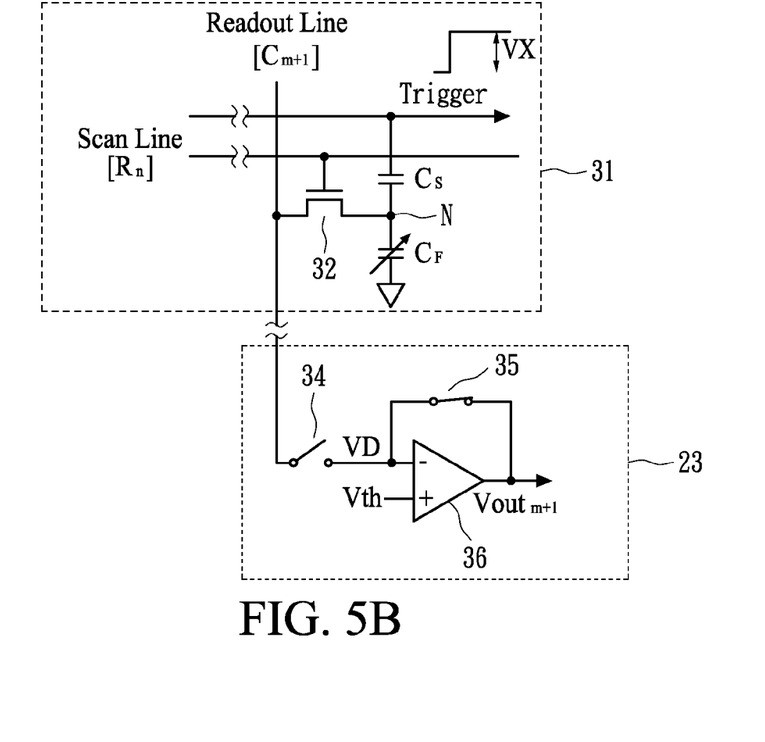

FIG. 5B shows the equivalent circuit of the fingerprint sensor in the transition phase. In the transition phase for the fingerprint sensor 31, the second transistor 34 is turned off, the third transistor 35 is still turned on, and the multiplexer 37 selects Vth. In the meanwhile, the trigger signal turns to high, and the voltage of the fingerprint capacitor changes to $$VA + \frac{C_S}{C_S + C_{FR}} \times VX \text{ or } VA + \frac{C_S}{C_S + C_{FV}} \times VX,$$

depending on which capacitance, i.e., ridge capacitance $C_{FR}$ or valley capacitance $C_{FV}$, is detected.

Figure 5C:
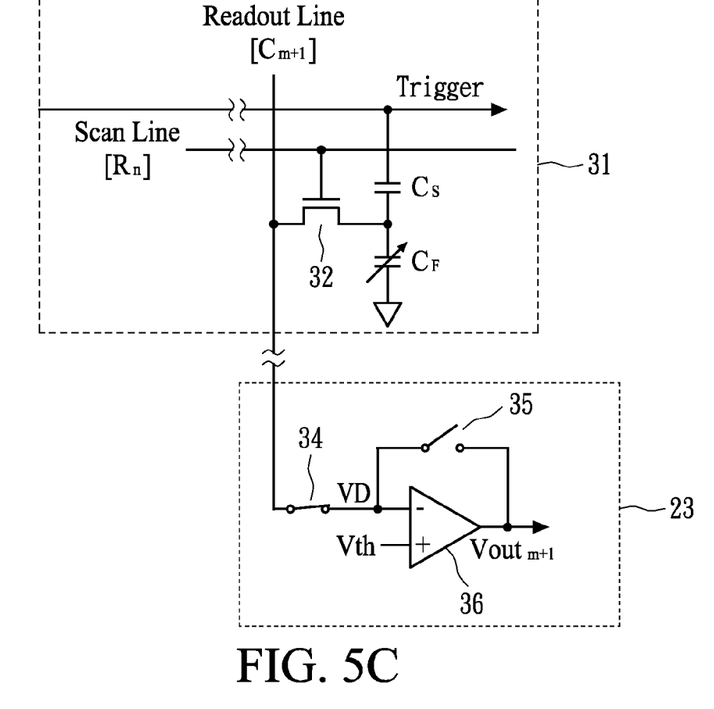

FIG. 5C shows the equivalent circuit of the fingerprint sensor in the evaluation phase. In the evaluation phase, the second transistor 34 is turned on, the third transistor 35 is turned off, and the multiplexer 37 still selects Vth. In the meanwhile, the operational amplifier 36 acts like a comparator. If the voltage of $$VA + \frac{C_S}{C_S + C_F} \times VX$$

is greater than Vth, $Vout_{m+1}$ will appear logic high; otherwise, a logic low is shown. In other words, to distinguish the ridge and valley capacitors, the Vth can be set as $$VA + \frac{C_S}{C_S + C_{FV}} \times VX > Vth > VA + \frac{C_S}{C_S + C_{FR}} \times VX.$$

Therefore, if the operational amplifier 36 outputs logic low, it means that the data received from the fingerprint sensor indicates a ridge capacitor. Otherwise, the data indicates a valley capacitor.

FIG. 6 shows a selecting part 63 of the readout circuit 23 in accordance with an embodiment of the present invention. The selecting part 63 comprises a multiplexer 62, which receives data from $Vout_1$ to $Vout_x$ and then transmits one of them sequentially to the image processing circuit 24.

The above-described embodiments of the present invention are intended to be illustrative only. Numerous alternative embodiments may be devised by persons skilled in the art without departing from the scope of the following claims.

What is claimed is:

1. A capacitive fingerprint sensor, comprising:
  a sensor cell comprising:
    a fingerprint capacitor having a capacitance that is either a valley capacitance $C_{FV}$ or a ridge capacitance $C_{FR}$;
    a reference capacitor $C_S$, with one end connected to the fingerprint capacitor, and the other end connected to a trigger signal, wherein the trigger signal is asserted only during a precharge phase, and $C_{FV} < C_S < C_{FR}$;

a first transistor having a gate terminal, an input terminal and an output terminal, wherein the gate terminal is controlled by a scan line, the input terminal is connected to the fingerprint capacitor, and the output terminal is connected to a readout line;

a control circuit comprising:

a second transistor having a gate terminal, an input terminal and an output terminal, wherein the gate terminal is controlled by a first reset line and the input terminal is connected to the readout line;

an operational amplifier, with one input end of the operational amplifier connected to the output terminal of the second transistor;

a third transistor having a gate terminal, an input terminal and an output terminal, wherein the gate terminal is controlled by a second reset line, and the input and output terminals are connected to the input and output ends of the operational amplifier; and a multiplexer connected to another input end of the operational amplifier, wherein inputs of the multiplexer are connected to a first voltage VA and a threshold voltage Vth.

2. The capacitive fingerprint sensor of claim 1, which is serially operated in precharge, transition and evaluation phases.

3. The capacitive fingerprint sensor of claim 2, wherein in the precharge phase, the scan line and the first reset line are asserted such that the multiplexer outputs the first voltage VA to the fingerprint capacitor.

4. The capacitive fingerprint sensor of claim 3, wherein in the precharge phase, the second reset line is further asserted.

5. The capacitive fingerprint sensor of claim 3, wherein in the transition phase, the first reset line is unasserted.

6. The capacitive fingerprint sensor of claim 5, wherein in the transition phase, the multiplexer outputs the threshold voltage Vth.

7. The capacitive fingerprint sensor of claim 2, wherein in the evaluation phase, the scan line and the first reset line are asserted, and the second reset line is unasserted.

8. A capacitive fingerprint sensor, comprising:

a sensor cell comprising:

a fingerprint capacitor having a capacitance that is either a valley capacitance $C_{FV}$ or a ridge capacitance $C_{FR}$, wherein $C_{FV}$ is smaller than $C_{FR}$;

a reference capacitor $C_S$, with one end connected to the fingerprint capacitor and the other end connected to a trigger signal, wherein the trigger signal is initiated only during a precharge phase; and a first transistor controlling the fingerprint capacitor during a scan line period; and a control circuit comprising:

a second transistor precharging the fingerprint and reference capacitors;

a comparator, with one input end of the comparator connected to the second transistor; and a multiplexer connected to another input end of the comparator for selectively providing a first voltage VA and a threshold voltage Vth.

9. The capacitive fingerprint sensor of claim 8, wherein the second transistor is precharging the fingerprint capacitor to the first voltage VA.

10. The capacitive fingerprint sensor of claim 8, which is serially operated in precharge, transition and evaluation phases.

11. The capacitive fingerprint sensor of claim 10, wherein the second transistor is used in the precharge and evaluation phases.

12. The capacitive fingerprint sensor of claim 10, wherein the multiplexer outputs the first voltage VA in the precharge phase, and outputs the threshold voltage Vth in the transition and evaluation phases.

13. The capacitive fingerprint sensor of claim 10, wherein the second transistor has an output voltage of $$VA + \frac{C_S}{C_S + C_{FR}} \times VX \text{ or } VA + \frac{C_S}{C_S + C_{FV}} \times VX$$

during the evaluation phase, and VX represents a falling deficiency of the trigger signal.

14. The capacitive fingerprint sensor of claim 10, wherein the threshold voltage Vth ranges between $$VA + \frac{C_S}{C_S + C_{FR}} \times VX \text{ and } VA + \frac{C_S}{C_S + C_{FV}} \times VX.$$

15. A panel system, comprising:

an active matrix area having fingerprint sensor cells, each fingerprint sensor cell comprising:

a fingerprint capacitor having a capacitance that is either a valley capacitance $C_{FV}$ or a ridge capacitance $C_{FR}$, and $C_{FV}$ is smaller than $C_{FR}$;

a reference capacitor $C_S$, one end connected to the fingerprint capacitor, and the other end connected to a trigger signal, wherein the trigger signal is asserted only during a precharge phase;

a first transistor having a gate terminal, an input terminal and an output terminal, wherein the gate terminal is controlled by a scan line, the input terminal is connected to the fingerprint capacitor, and the output terminal is connected to a readout line;

a scan driver controlling scan lines to the active matrix area;

a readout circuit, comprising:

a second transistor having a gate terminal, an input terminal and an output terminal, wherein the gate terminal is controlled by a first reset line and the input terminal is connected to the readout line;

an operational amplifier, with one input end of the operational amplifier connected to the output terminal of the second transistor;

a third transistor having a gate terminal, an input terminal and an output terminal, wherein the gate terminal is controlled by a second reset line, and the input and output terminals are connected to the input and output ends of the operational amplifier; and a multiplexer connected to another input end of the operational amplifier, wherein inputs of the multiplexer are connected to a first voltage VA and a threshold voltage Vth; and an image processing circuit connected to the readout circuit.

16. The panel system of claim 15, wherein the readout circuit further comprises an output multiplexer, and the input end of the output multiplexer is connected to the outputs of the operational amplifier.

17. The panel system of claim 15, wherein the active matrix area further includes image pixels, and the panel system further comprises a data driver to drive the image pixels.

18. The panel system of claim 15, wherein one scan line is enabled during the operations of the capacitive fingerprint sensors connected to the scan line.

* * * * *